UNITED STATES PATENT OFFICE.

JOSEPH THOMLINSON, OF PORTLAND, OREGON.

PROCESS OF PRESERVING FISH.

No. 850,451.        Specification of Letters Patent.        Patented April 16, 1907.

Application filed February 27, 1905. Serial No. 247,593.

*To all whom it may concern:*

Be it known that I, JOSEPH THOMLINSON, a citizen of the United States, residing at Portland, in the county of Multnomah and State of Oregon, have invented a new and useful Improvement in a Process for Preserving Fish, of which the following is a specification.

This invention relates to a preserving process especially adapted for the protection and preservation of fish intended to be shipped and especially to fish intended to be shipped to warm climates, although the process can of course be used in connection with fish intended to be stored for future use.

In carrying out the process the article to be preserved is placed in a fine-grained canvas bag and the top of the bag or sack securely tied and placed in a liquid, which is brought to a boiling-point and kept there until the article to be preserved has been brought to the desired temperature. The bag is then taken from the boiling liquid and the liquid squeezed therefrom with a pair of tongs or in any other suitable manner and is placed in a box containing dry powdered plaster-of-paris in which has been mixed a small quantity of borax. The bag is then removed from the box and the surplus plaster wiped or brushed off and the bag is then dipped into a tub of liquid plaster-of-paris. The bag is then drawn from the tub and the plaster will be allowed to set, and after it has become hard it is covered with one or more coats of linseed-oil varnish, shellac-varnish, or some other suitable preparation adapted to give the outer coating of plaster a glazed surface.

In the treatment of fish I prefer to preserve them in their original shape, cutting the head and tail off, splitting them, and cleaning out the interior and rinsing in clean water. A piece of set plaster-of-paris is then placed within the fish to aid in preserving the shape and the same placed in a fine-grained canvas bag of the proper shape and size, which is placed in oil and boiled until it reaches a temperature of 338° Fahrenheit. The bag is then withdrawn from the oil and treated with the powdered and the liquid plaster-of-paris and varnished or glazed, as previously described.

Having thus fully described my invention, what I claim as new, and desire to secure by Letters Patent, is—

The process herein described which consists in preserving fish by cutting off the head and tail portions splitting, rinsing the interior, placing a piece of set plaster-of-paris within the fish, inclosing the fish in a bag, placing the same in oil and raising the same to a temperature of approximately 338° Fahrenheit, withdrawing the bag from the oil, treating the same with powdered and liquid plaster-of-paris and then glazing.

JOSEPH THOMLINSON.

Witnesses:
   ISAAC THOMLINSON,
   EDGAR THOMLINSON.